(12) United States Patent
Iitsuka

(10) Patent No.: US 6,722,539 B2
(45) Date of Patent: Apr. 20, 2004

(54) MECHANISM FOR ENGAGING PORTABLE EQUIPMENT AGAINST A BELT CLIP

(75) Inventor: Yoshitune Iitsuka, Yokohama (JP)

(73) Assignee: Vertex Standard USA, Inc., Cypress, CA (US)

( * ) Notice: Subject to any disclaimer, the term of this patent is extended or adjusted under 35 U.S.C. 154(b) by 22 days.

(21) Appl. No.: 10/046,479

(22) Filed: Oct. 19, 2001

(65) Prior Publication Data
US 2003/0102341 A1 Jun. 5, 2003

(30) Foreign Application Priority Data
Oct. 19, 2000 (JP) .................................. 2000-319169

(51) Int. Cl.$^7$ ............................................... B65D 25/52
(52) U.S. Cl. ..................... 224/197; 224/242; 224/270; 224/271; 224/272; 224/930; 248/225.11
(58) Field of Search .................... 224/197, 242, 224/251, 269, 270, 271, 272, 930, 191, 904; 24/3.7, 3.11, 665; 248/225.11

(56) References Cited

U.S. PATENT DOCUMENTS 5,597,102 A * 1/1997 Saarikko et al. ............ 224/197
5,850,954 A * 12/1998 Dong-Joo ................... 224/197
6,059,156 A * 5/2000 Lehtinen .................... 224/197

* cited by examiner

Primary Examiner—Gregory Vidovich
Assistant Examiner—Maerena W. Brevard
(74) Attorney, Agent, or Firm—Fulwider Patton Lee & Utecht, LLP (57) ABSTRACT

There is provided an engaging mechanism of a system in which the flange-like protrusion at the portable equipment is engaged with or locked to an engaging part at a belt clip, wherein both fitting and removing for the portable equipment are simplified. The system such that the flange 5 at the portable equipment 1 is constituted by the disc 6 and the annular frame 7, the protrusion 8 directed inwardly from the annular frame 7 with its circumferential sides being applied as slant surfaces 8b and 8c; the engaging plate 23 of the belt clip 21 (refer to FIG. 2) is provided with the engaging part 210 comprised of the frame 211 and the front plate 214 formed with the U-shaped recess 213, the engaging plate 23 is constituted by the cantilever beam 31 defined by the slit 30, the extremity end of the beam 31 is formed with the claw 29 with its upper side being applied as the slant surface 29a; when the flange 5 is fitted into the engaging part 210, the claw 29 is fitted inside the annular frame 7 to apply a locked state, and when the portable equipment 1 is turned by 180°, the protrusion 8 causes the claw 29 to be retracted and releases the locked state.

10 Claims, 12 Drawing Sheets

MECHANISM FOR ENGAGING PORTABLE EQUIPMENT AGAINST A BELT CLIP

BACKGROUND OF THE INVENTION

1. Field of the Invention

This invention relates to a mechanism for removably engaging an item of portable equipment such as a transceiver or the like with a belt clip installed on either a band or a belt.

2. Description of the Prior Art

The rapid progress or advancement in a semiconductor manufacturing technology in recent years has caused a remarkable small-sized formation of portable wireless machines such as a transceiver or various kinds of measuring equipment, and this progress has further caused a portable system with a belt clip to be widely used.

That is, these types of portable equipment are most conveniently installed at either a waist part or a belly part of a person with belt clip due to the fact that their size or weight is too large or heavy for being stored in a pocket in its-non-used state, or when they are put in a bag or the like, they are inconveniently taken out and used every time they are needed.

Then, with this kind of belt clip, there are provided one system in which the belt clip is directly fixed to either a casing surface of a portable equipment or its protection cover in advance and the other system in which a convenient engaging part arranged independently at the portable equipment is engaged with the belt clip.

In the former system, since the entire belt clip is integrally assembled with the portable equipment, there occurs a certain disadvantage in convenience of use at the time of utilization of the portable equipment, and further since the belt clip is installed at the belt with its clip side holding either the band or the belt, an inconvenience state created in which smooth fitting or removing cannot be carried out.

In turn, in the case of latter system, the portable equipment is merely provided with a convenient and small engaging part, a mechanism that can be easily fitted or disengaged between the engaging part and the belt clip can be independently constituted, so that such disadvantage and inconvenience in operation are not produced.

In the case of the engaging mechanism in which the belt clip and the portable equipment are installed independently, it is required to perform an easy engaging or disengaging operation and the belt clip is not easily removed under vibration and the like.

Accordingly, although various kinds of mechanisms have been proposed as the aforesaid engaging mechanism, the system having the configuration shown in FIGS. 10 to 13 is shown as one example.

Figure 10:
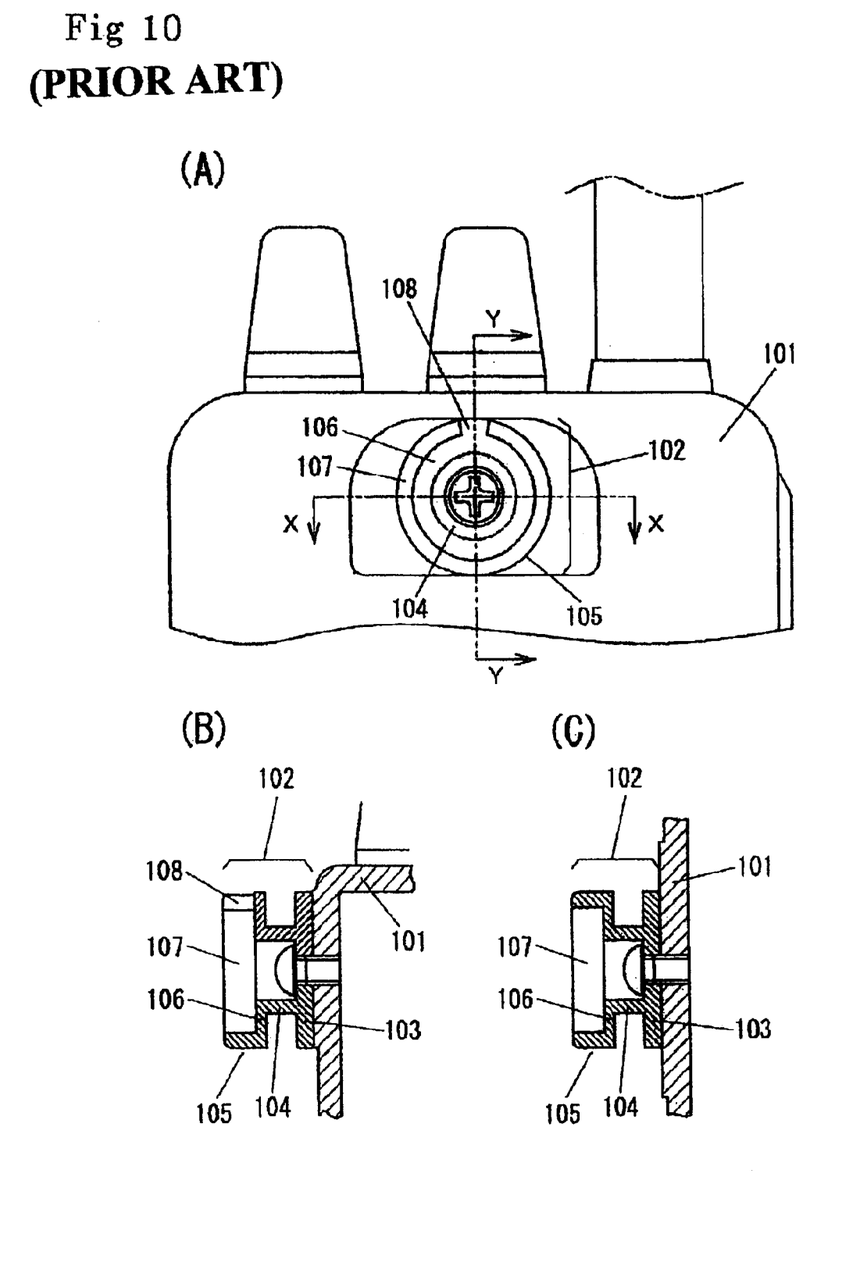
FIG. 10 is a view for showing a mechanism of a portable equipment in an engaging mechanism of the prior art (a system in which the portable equipment and the belt clip are kept independent from each other and a convenient protrusion arranged at the portable equipment is locked with the engaging part of the belt clip), where (A) is a substantial front elevational view for showing the portable equipment; (B) is a sectional view taken along an arrow line Y—Y in (A); and (C) is a sectional view taken along an arrow line X—X in (A).

At first, FIG. 10 shows a mechanism applied at the portable equipment, where (A) is a substantial front elevational view for showing the portable equipment; (B) is a sectional view taken along an arrow line Y—Y in (A); and (C) is a sectional view taken along an arrow line X—X in (A).

In this figure, 101 denotes a portable equipment, 102 denotes a protrusion fixed with a screw at a rear surface of a casing of the portable equipment 101, where the protrusion 102 is comprised of a base 103 corresponding to a fixing plate, a cylindrical short column 104 and a flange 105.

In addition, the flange 105 is comprised of a disc 106 and an annular frame 107 formed around the circumferential edge of the disc, where the annular frame 107 is formed with a discontinuous segment 108 at its upper part.

Figure 11:
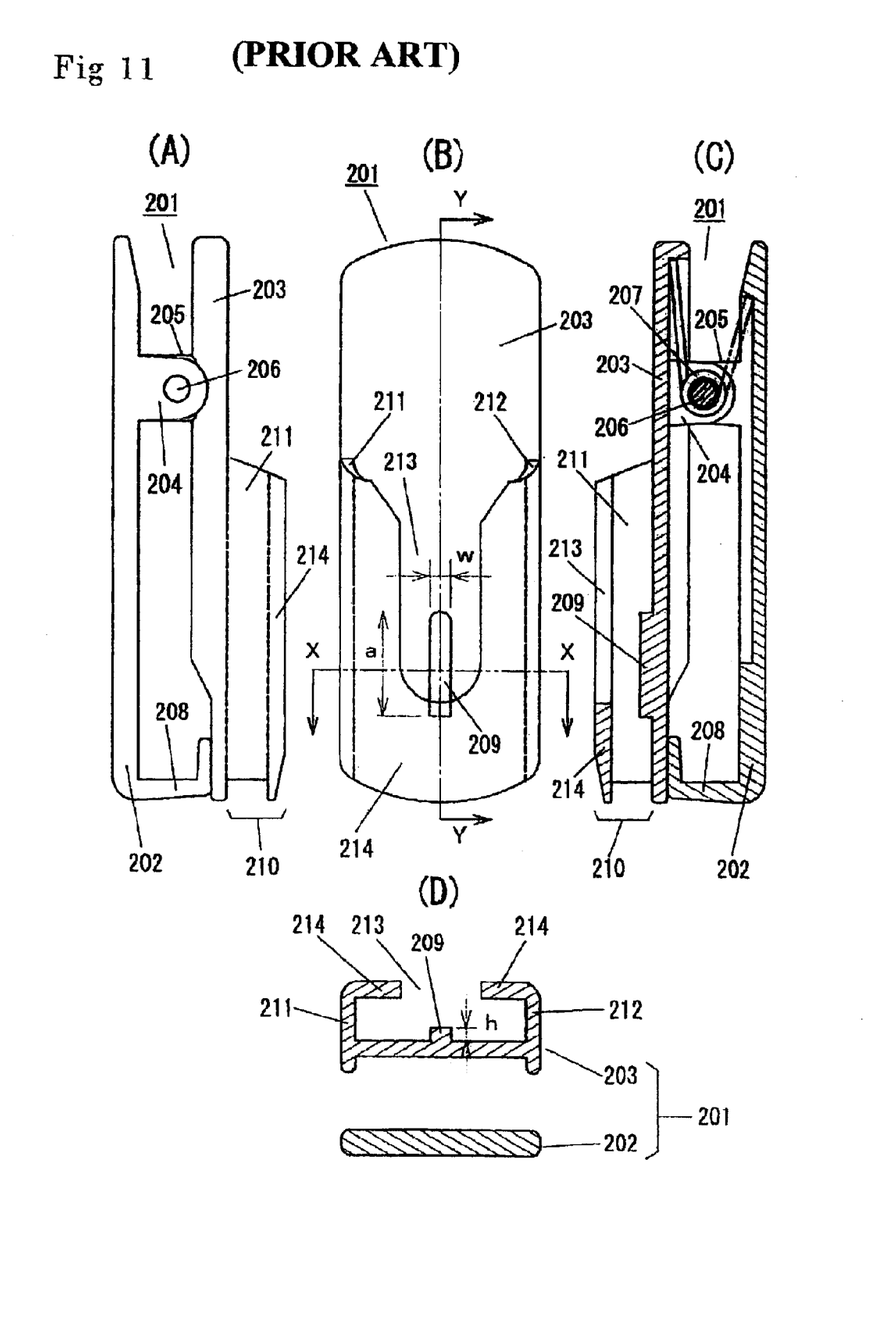
FIG. 11 is a view for showing a mechanism of a belt clip corresponding to the mechanism of the portable equipment shown in FIG. 10, where (A) is a left side elevational view for showing the belt clip; (B) is a front elevational view; (C) is a sectional view taken along an arrow line Y—Y in (B); and (D) is a sectional end view taken along an arrow line X—X in (B).

In turn, FIG. 11 shows a mechanism at the belt clip, where (A) is a left side elevational view for showing the belt clip; (B) is a front elevational view; (C) is a sectional view taken along an arrow line Y—Y in (B); and (D) is a sectional end view taken along an arrow line X—X in (B).

In this figure, 201 denotes a belt clip, 202 denotes a clip and 203 denotes an engaging plate for engaging with the portable equipment 101.

In this figure, the clip 202 and the engaging plate 203 are integrally formed with bearing plates 204 and 205 at both sides near their upper positions of their opposing faces, wherein both bearing plates 204, 205 are rotatably connected at a shaft 206 under a state in which both bearing plates 205 at the engaging plate 203 fit both bearing plates 204 of the clip 202 inside.

Then, a twisted coil spring 207 is fitted outside between both bearing plates 204 at the shaft 206, both arms of the twisted coil spring 207 press and bias against each of the inner surface of the clip 202 and the inner surface of the engaging plate 203.

In addition, the lower end of the clip 202 is integrally formed with an L-shaped hook 208 facing inside, and a biasing force attained by both arms of the twisted coil spring 207 pushes the extremity end of the hook 208 against the engaging plate 203 under a principle of lever with the shaft 206 being applied as a fulcrum.

Accordingly, although each of the plate surfaces of the clip 202 and the engaging plate 203 is normally in a parallel state to each other, when the upper sides of the clip 202 and the engaging plate 203 are held with fingers to cause them to be approached to each other, the extremity end of the clip 202 is opened, resulting in that a belt is received between it and the engaging plate 203 under this opened state and after this operation, when the holding pressure by the fingers is released, the belt clip 201 can be installed at the belt.

The front surface of the engaging plate 203 is formed with a small-protrusion type claw 209 and an engaging part 210.

In this case, the claw 209 has such a shape as one in which a width (w) of the claw 209 is narrower than a width of the discontinuous segment 108 of the annular frame 107 formed at the flange 105 of the portable equipment 101, a length (a) of the claw 209 is smaller than an inner diameter of the annular frame 107, and a height (h) of the claw is set to be lower than a height of the annular frame 107, wherein the claw is formed at the central position of the lower region of the engaging plate 203.

In addition, the engaging part 210 is comprised of frames 211, 212 arranged at both sides and a front plate 214 formed with a substantial U-shaped recess 213, and this is constituted as a cylindrical member at the surface of the engaging plate 203.

Figure 12:
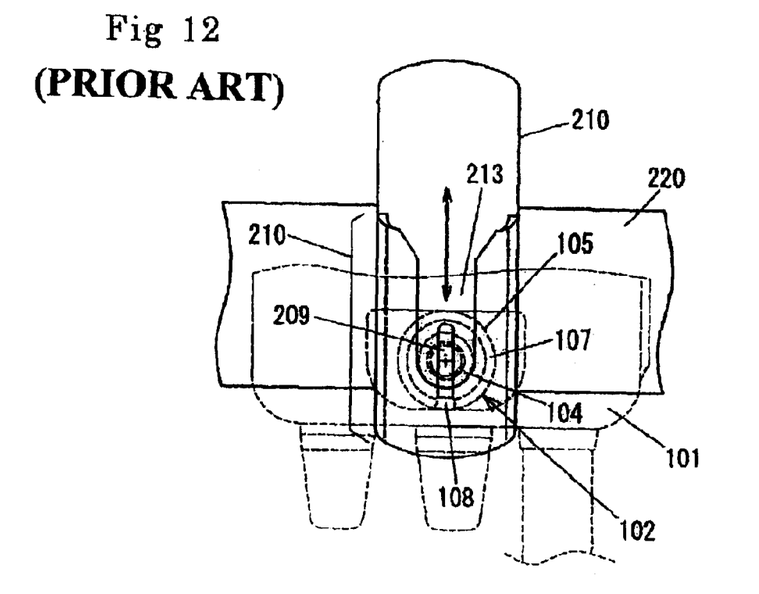
FIG. 12 is a front elevational view for showing a state in which the portable equipment is engaged with the belt clip in the engaging mechanism of the prior art, where a configuration of the belt clip is indicated by a solid line and a configuration of the portable equipment is indicated by a broken line.

In such a configuration comprised of the protrusion 102 at the portable equipment 101 and the engaging plate 203 at the belt clip 201, when the portable equipment 101 is set upside down (the discontinuous segment 108 of the annular frame 107 at the protrusion 102 being set at a lower side) and its flange 105 is fitted into the engaging part 210 at the belt clip 201 under a state in which the belt clip 201 is being installed at the belt 220, as shown in FIG. 12, the flange 105 is guided down to the lower side of the engaging part 210 while the short column part 104 of the protrusion 102 is being guided by the recess 213.

Then, the discontinuous segment 108 at the annular frame 107 of the portable equipment 101 causes the entire claw 209 at the belt clip 201 to be inserted into the annular frame 107 and then the short column 104 at the portable equipment 101 under this state is engaged with the lower-most part of the recess 213 of the belt clip 201.

Figure 13:
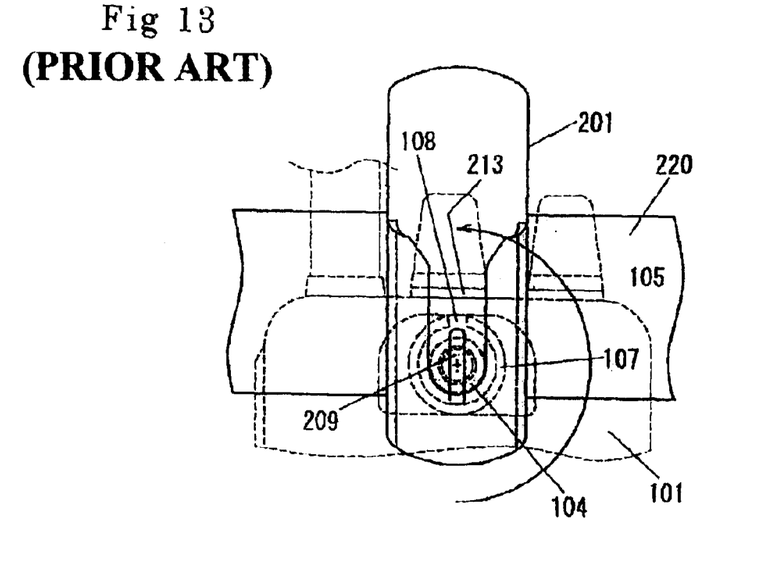
FIG. 13 is a front elevational view for showing a state in which the portable equipment is engaged with the belt clip at the engaging mechanism of the prior art, thereafter it is locked, where a configuration of the belt clip is indicated by a solid line and a configuration of the portable equipment is indicated by a broken line.

Then, as shown in FIG. 13, when the portable equipment 101 is turned from the aforesaid state by 180°, the annular frame 107 at the flange 105 is naturally turned around the claw 209 at the belt clip 201, and the discontinuous segment 108 is positioned at the upper side of the claw 209.

Accordingly, the lower side of the annular frame 107 of the flange 105 at the portable equipment 101 is engaged with the claw 209 at the belt clip 201, its short column 104 is restricted under a diagonal relation where it can be moved upward only by the recess 213 at the belt clip 201, resulting in that the portable equipment 101 becomes positioned such that the belt clip 201 can be removed only after the portable equipment 101 is turned again by 180°.

That is, the portable equipment 101 is engaged with the belt clip 201 under a locked state where a removal stopping is applied.

In turn, when the portable equipment 101 is to be removed, it is turned by 180° from the aforesaid locked state to cause the state shown in FIG. 12 to be attained, resulting in that when the portable equipment 101 is to be used, the operation is performed to pull it upward to enable the engaged state against the belt clip 201 to be released.

As another practical example of the engaging mechanism when the belt clip and the portable equipment are made independent from each other, there is also provided another system in which they are released from their engaged state through a button handling operation.

More practically, the belt clip is provided with a claw biased by a spring mechanism, the claw is pushed in when a hook installed on the portable equipment is engaged with the belt clip, the claw returns when a recess formed at the hook reaches the claw and the claw is engaged with the recess to cause it to be locked, wherein there is also provided a mechanism at the belt clip to cause the aforesaid locked state to be optionally released through the button handling operation, wherein when the portable equipment is used, the button is depressed to cause the claw to be forcedly drawn from the recess or the like and the hook can be removed from the belt clip.

Accordingly, in view of its principle, a general type of engaging/releasing mechanism widely applied in other fields is applied.

In accordance with the engaging mechanism shown in FIGS. 10 to 13, it is necessary to turn the portable equipment 101 by 180° when the portable equipment 101 is fixed to or removed from the belt clip 201 and this shows an inconvenience that the turning operation must be carried out every time the fixing or removal operation is performed.

In particular, at the time of the belt clip fixing operation, the flange 105 of the portable equipment 101 is normally engaged under a state in which it is stored at the engaging part 210 at the belt clip 201, although if it is forgotten to turn the portable equipment 101, the lock mechanism does not engage and the portable equipment 101 is displaced and dropped due to vibration or the like to cause either damage or trouble to be frequently generated.

In turn, in the case of the button operating type engaging mechanism, it is possible to perform a locking operation without turning the portable equipment, so that the aforesaid inconvenience or disadvantage is not generated. However, when the portable equipment is removed, both the pulling-out operation for the hook and the button operation must be carried out concurrently and it creates an inconvenience in that the removing operation must always be carried out with both hands.

Further, due to application of both hands, it is necessary that the installing position of the belt clip is always set to face against the front part of the belly or near the belly and if an operator performs other activities while keeping a forward inclined attitude, some troubles are frequently produced.

SUMMARY OF THE INVENTION

In view of the foregoing, the present invention has been created to provide a rational engaging mechanism in which the belt clip and the portable equipment are set independently, wherein it is possible to engage or lock the portable equipment without turning it and the fixing operation is made simple to enable a disengagement of the lock to be prevented.

A first embodiment of the subject invention provides an engaging mechanism for portable equipment in respect to a belt clip of a system in which the portable equipment is provided with a protrusion comprised of a short column and a flange, a plate surface of the belt clip is formed with an engaging part composed of frames arranged at both sides and a front plate formed with a substantial U-shaped recess, the short column at the portable equipment is guided by the recess at the belt clip to cause the flange to be fitted to and held at the engaging part, thereby the portable equipment is removably attached to the belt clip characterized in that the flange at the portable equipment is constituted by a disc and the annular frame formed at the circumferential edge of the disc, the upper surface of the protrusion is in continuous with the end surface of the annular frame under a state in which it is protruded inwardly from the annular frame, a protrusion having its circumferential side applied as a slant surface is formed, and in turn, the belt clip is formed with a claw having the side surface corresponding to the released side of the recess at the engaging part applied as a slant surface and the opposite side surface applied as an engaging surface against the annular frame in an area opposing against a space between an inward directed surface of the protrusion and the annular frame under a state in which the flange at the portable equipment reaches the fitting limit part of the engaging part, its plate surface is formed with a substantial U-shaped slit containing the claw inside to constitute a resilient cantilever beam.

According to this embodiment, when the flange on the portable equipment is fitted to the engaging part on the belt clip, the annular frame at the flange causes the cantilever beam to be flexed while being slidingly contacted with the slant surface of the claw formed at the belt clip and when the claw rides over the annular frame and is fitted between the protrusion of the flange and the annular frame, the resilient cantilever beam returns back to its original state.

Accordingly, under this state, the claw is present inside the annular frame and also in the recess except the protrusion and the engaging surface of the claw is engaged with the inner wall surface of the annular frame so long as the flange is not turned by about 180°, so that the flange is not pulled out of the annular frame. That is, the portable equipment becomes locked with the belt clip.

In turn, if the flange is turned by about 180° from its position after it is fitted, the slant surface formed at the side surface of the protrusion of the flange cause the cantilever beam to be flexed while being slidingly contacted under a state in which it rides over the claw at the belt clip from its circumferential direction, and the upper surface of the protrusion at the flange rides over the upper side of the claw.

Then, since the upper surface of the protrusion at the flange is continuous with the end surface of the annular frame, if the flange turned by about 180° is moved toward the released side of the recess at the belt clip as it is, the flange can be removed from the engaging part. That is, the locked state is released and the portable equipment can be removed from the belt clip.

A second embodiment of the subject invention provides an engaging mechanism of a portable equipment in respect to a belt clip of a system in which the portable equipment is provided with a protrusion comprised of a short column and a flange, a plate surface of the belt clip is formed with an engaging part composed of frames arranged at both sides and a front plate formed with a substantial U-shaped recess, the short column at the portable equipment is guided by the recess at the belt clip to cause the flange to be fitted to and held at the engaging part, thereby the portable equipment is removably attached to the belt clip characterized in that the flange at the portable equipment is constituted by a disc and the annular frame formed at the circumferential edge of the disc, the upper surface of the protrusion is in continuous with the end surface of the annular frame under a state in which it is protruded inwardly from the annular frame, and in turn, the belt clip is formed with a claw having the side surface corresponding to the released side of the recess at the engaging part and both side surfaces adjacent to the former side surface applied as slant surfaces and having the other side surface as an engaging surface against the annular frame in an area opposing against a space between an inward directed surface of the protrusion and the annular frame under a state in which the flange at the portable equipment reaches the fitting limit part of the engaging part, its plate surface is formed with a substantial U-shaped slit containing the claw inside to constitute a resilient cantilever beam.

The second embodiment differs from the first embodiment in view of the fact that both side surfaces at the claw of the belt clip are applied as slant surfaces in opposition to the first invention in which the slant surface is arranged at the circumferential side of the protrusion of the flange at the portable equipment, while the other composing elements in the second embodiment are the same as that of the first embodiment.

More practically, their differences merely consist in the fact that when the portable equipment is removed from the belt clip, the slant surface is formed at the protrusion of the flange to cause the protrusion of the flange to be ridden over the claw of the belt clip, or the slant surface is formed at the claw of the belt clip, and a function attained by each of the mechanism elements at the stage of fixing or removing is the same as that of the first invention except the above different points.

DETAILED DESCRIPTION OF THE PREFERRED EMBODIMENTS

Referring now to FIGS. 1 to 9, the preferred embodiments of the engaging mechanism of the portable equipment against the belt clip of the invention will be described in detail.

Preferred Embodiment 1

Figure 1:
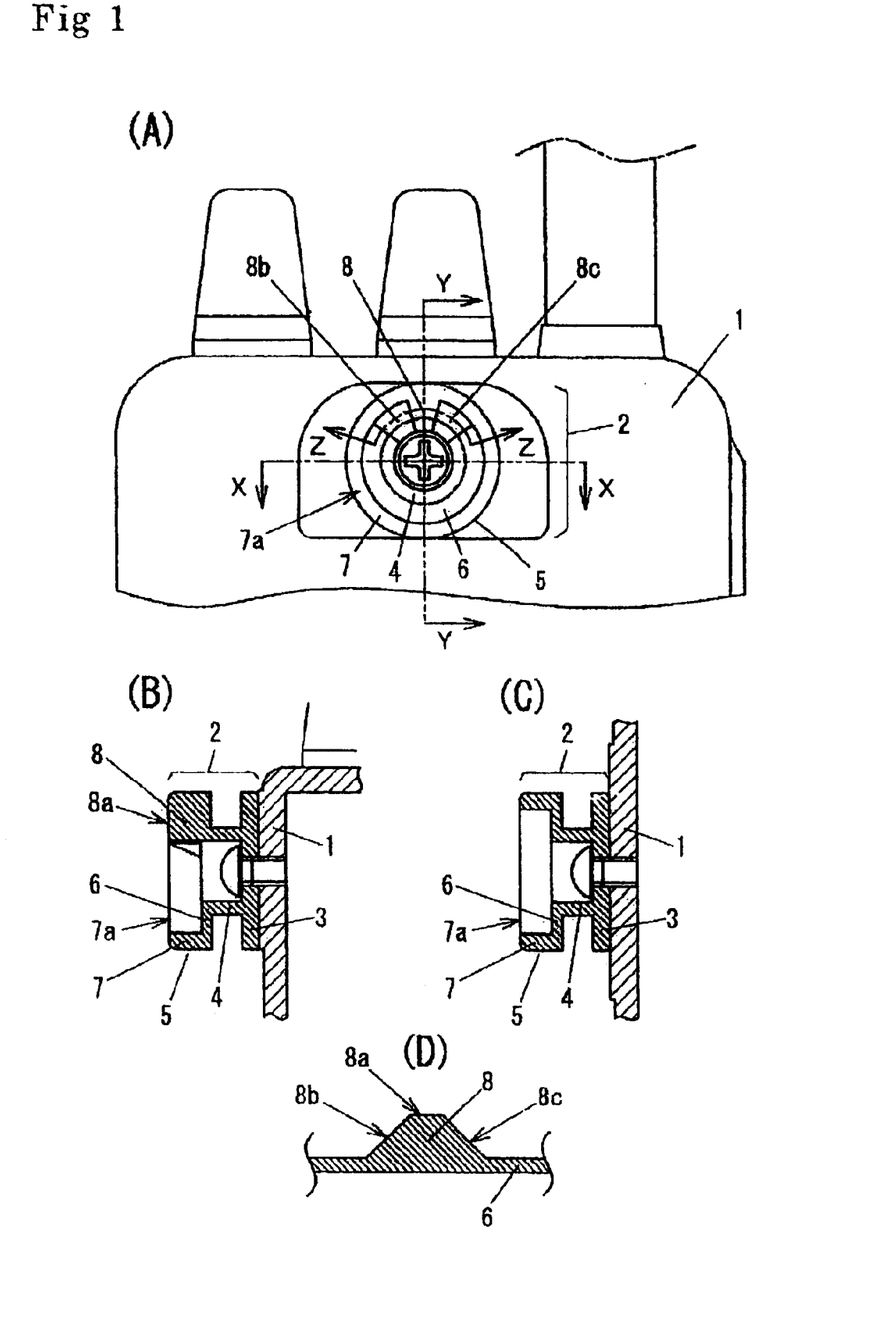
FIG. 1 is a view for showing a mechanism on a portable equipment in accordance with a preferred embodiment 1 of the present invention, wherein (A) is a substantial front elevational view for showing a portable equipment; (B) is a sectional view taken along an arrow line Y—Y in (A); (C) is a sectional view taken along an arrow line X—X in (A); and (D) is a sectional view taken along an arrow line Z—Z in (A).

The mechanism on the portable equipment in this preferred embodiment is shown in FIG. 1, wherein (A) is a substantial front elevational view for showing a portable equipment; (B) is a sectional view taken along an arrow line Y—Y in (A); (C) is a sectional view taken along an arrow line X—X in (A); and (D) is a sectional view taken along an arrow line Z—Z in (A).

In this figure, reference numeral 1 denotes an item of portable equipment (a transceiver, for example) and reference numeral 2 denotes a protrusion fixed with a screw to the rear surface of a casing in the portable equipment 1.

As apparent from a comparison between FIG. 1 and FIG. 10, although the protrusion 2 in this preferred embodiment is the same as that shown in FIG. 10 in view of the fact that the protrusion is comprised of the base mount 3, the cylindrical short column 4 and the flange 5, the construction of the flange 5 is different from that shown in FIG. 10.

More practically, although the flange 5 is comprised of a disc 6 and an annular frame 7 formed at the circumferential edge of the disc 6, discontinuous segment 108 as found in FIG. 10 is not present at the annular frame 7 and it is formed as a continuous annular frame.

Then, a feature of this flange 5 consists in the fact that a protrusion 8 is formed under an embodiment in which it is protruded inwardly from the inner wall surface at the upper position of the annular frame 7.

This protrusion 8 is made such that its upper surface 8a is continuous at the same height as that the end surface 7a of the annular frame 7 and both sides of the annular frame in the circumferential direction are formed as slant surfaces 8b and 8c.

Accordingly, the sectional surface of the disc 6 in a circumferential direction near the protrusion 8 [refer to the sectional view taken along an arrow line Y—Y of FIG. 1(A)] becomes a protrusion having trapezoidal waveform shape as shown in FIG. 1(D).

Figure 2:
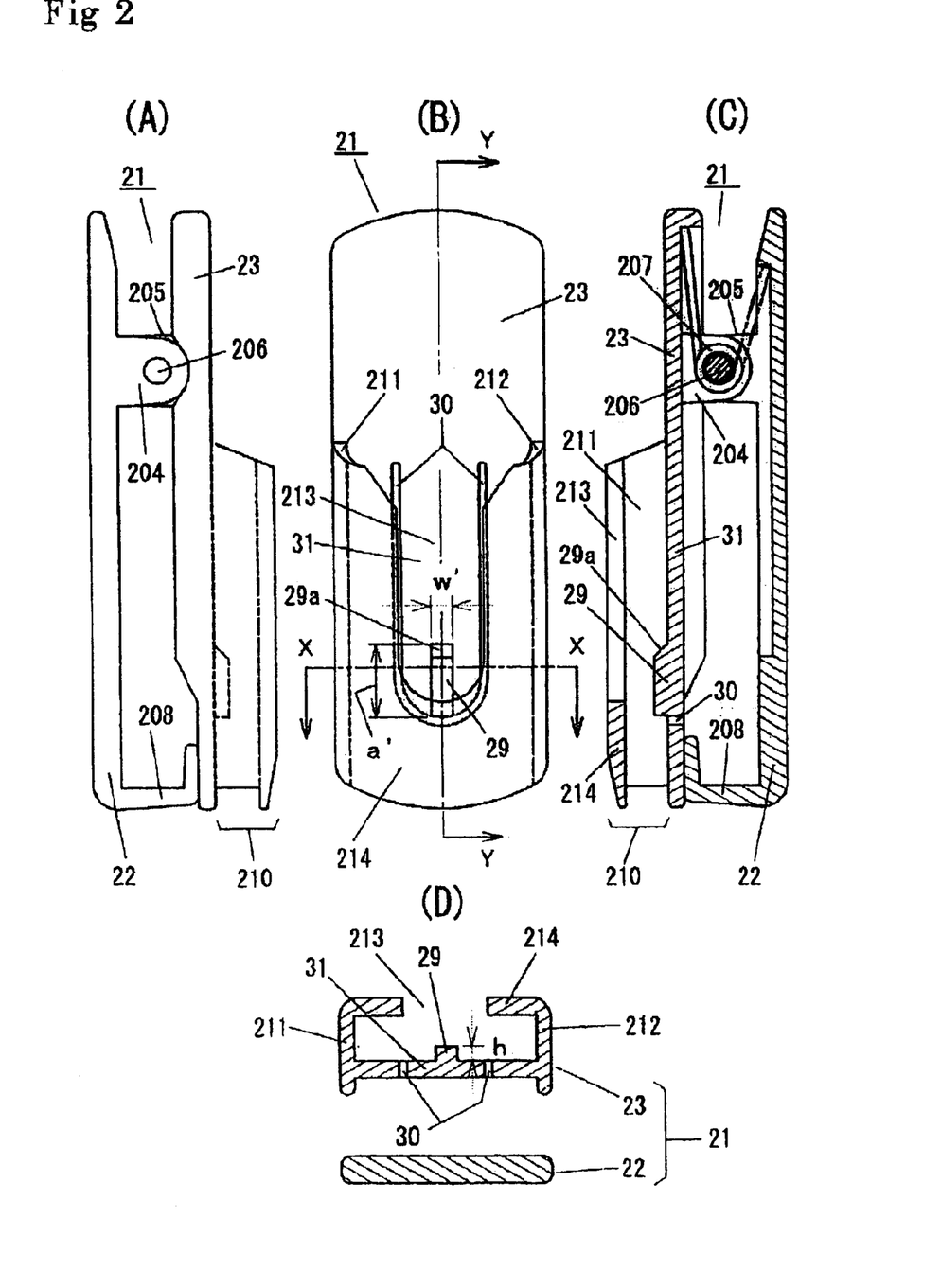
FIG. 2 is a view for showing a mechanism at a belt clip in accordance with a preferred embodiment of the present invention, wherein (A) is a left side elevational view for showing the belt clip; (B) is a front elevational view; (C) is a sectional view taken along an arrow line Y—Y in (B); and (D) is a sectional end view taken along an arrow line X—X in (B).

In turn, the mechanism at the belt clip in the preferred embodiment is shown in FIG. 2, wherein (A) is a left side elevational view for showing the belt clip; (B) is a front elevational view; (C) is a sectional view taken along an arrow line Y—Y in (B); and (D) is a sectional end view taken along an arrow line X—X in (B).

In this figure, reference numeral 21 denotes a belt clip, reference numeral 22 denotes a clip, reference numeral 23 denotes an engaging plate for use in engaging with the aforesaid portable equipment 1. As apparent from a comparison with FIG. 11, this basic configuration and a connecting mechanism between the clip 22 and the engaging plate 23 are the same as that shown in FIG. 11.

Accordingly, the mechanism elements shown in FIG. 2 having the same configuration as that of the belt clip 201 shown in FIG. 11 are denoted by the same reference symbols.

A feature of the belt clip 21 in this preferred embodiment consists in a shape of the claw 29 formed at the surface of the engaging plate 23 and the arrangement in which a U-shaped slit 30 is formed at the engaging plate 23.

Practically, although the claw 209 in FIG. 11 is made such that its side wall is perpendicular to the surface of the engaging plate 203, the claw 29 in this preferred embodiment is formed such that the side wall of the upper side is applied as a slant surface 29a, and a planar size formed by its width w' and a length (b) is set to be included between the inwardly directed plane of the protrusion 8 of the flange 5 and the annular frame 7 shown in FIG. 1(A).

In addition, although the engaging plate 203 in FIG. 11 is merely formed with a claw 209, a U-shaped slit 30 in this preferred embodiment is formed under a state in which the installing region for the claw 29 is included inside and this slit 30 forms a cantilever beam 31 extending in a vertical direction and having the claw 9 arranged in the central region at the extremity end surface.

Both the clip 22 and the engaging plate 23 of the belt clip 21 are generally formed by synthetic resin, so that the cantilever beam 31 may act as a leaf spring in response to a shape of the slit 30 and a longitudinal modulus of elasticity of its raw material.

Figure 3:
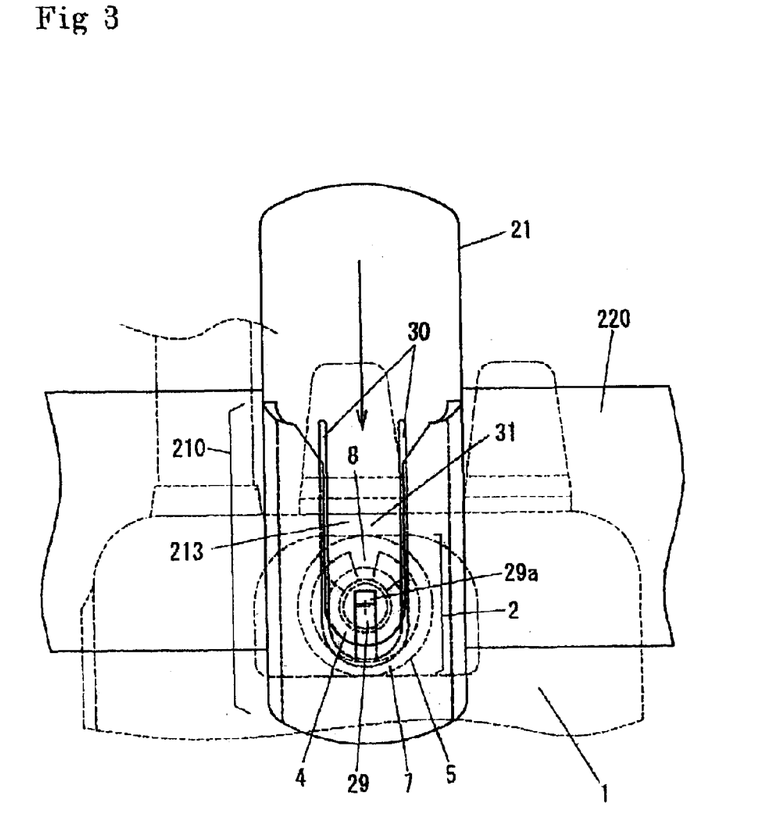
FIG. 3 is a front elevational view for showing a state in which a portable equipment is engaged with and locked on the belt clip, where a configuration of the belt clip is indicated by a solid line and a configuration of the portable equipment is indicated by a broken line.

As shown in FIG. 3, when the flange 5 the portable equipment 1 is fitted into the engaging part 210 at the belt clip 21 in an upward or downward relation (the protrusion 8 of the flange 5 at the protrusion 2 is an upper side) of the construction of the protrusion 2 at the portable equipment 1 and the engaging plate 23 at the belt clip under a state in which the belt clip 21 is installed at the belt 220, the flange 5 is guided to the lower side of the engaging part 210 while the short column 4 of the protrusion 2 is being guided by the recess 213 in the same manner as that shown in FIG. 12.

Then, under the fitting stage, there is provided a state in which the lower side of the annular frame 7 at the flange 5 is contacted with the claw 29 of the engaging plate 23 at the belt clip 21.

Figure 4:
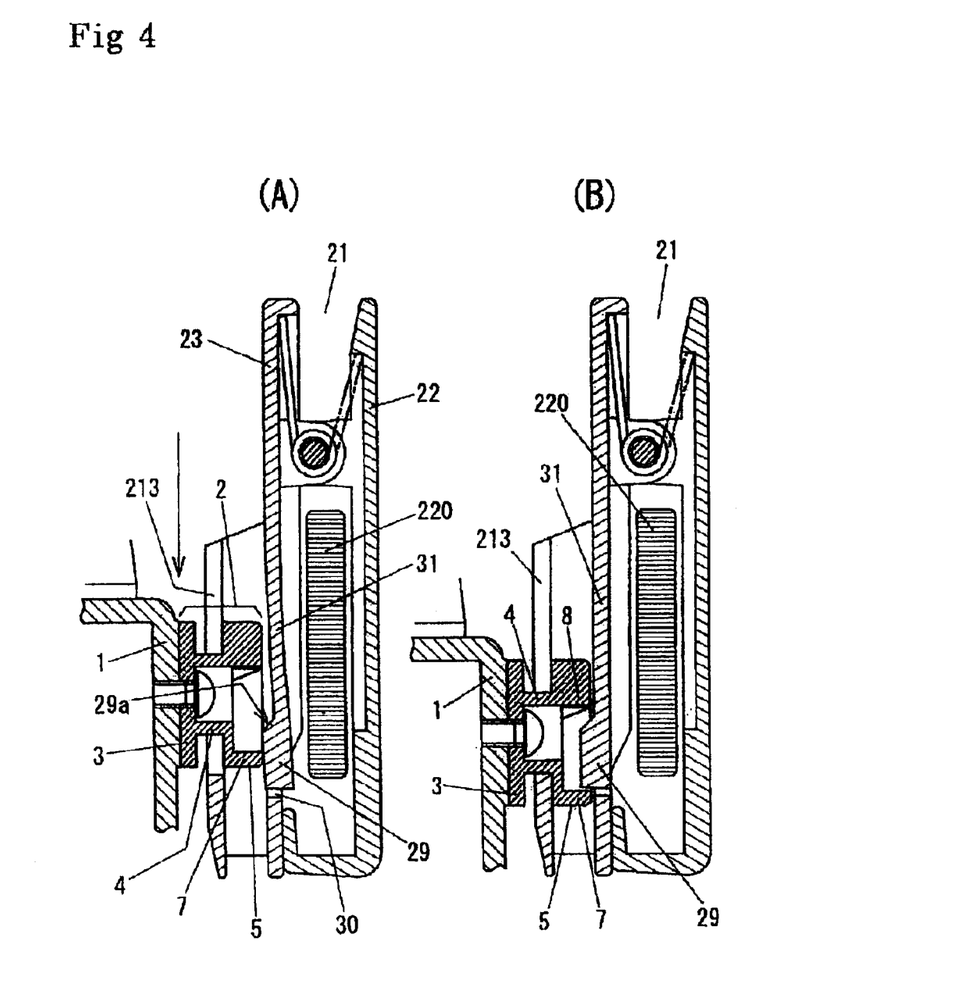
FIG. 4 is a sectional view (A) for showing a state in which an annular frame of a flange on the portable equipment presses against a claw of the belt clip to cause it to be retracted during a process for engaging the portable equipment with the belt clip; and a sectional view (B) for showing an engaged and locked state.

However, the upper side wall of the claw 29 is constituted as a slant surface 29a as described above and further the claw 29 is formed in an extremity end region of the cantilever beam 31 constituted by the slit 30, so that the end surface of the annular frame 7 at the flange 5 fitted as shown in FIG. 4(A) causes the cantilever beam 31 to be flexed while being slidingly contacted with the slant surface 29 of the claw 29, and then the annular frame 7 rides over the upper surface of the claw 29.

Further, when the flange 5 at the portable equipment 1 is guided to the lower side of the engaging part 210 and the short column 4 is engaged with the lower-most part of the recess 213 at the belt clip 21, the annular frame 7 rides over the claw 29 and the cantilever beam 31 returns back to its original state by its resiliency as shown in FIGS. 3 and 4(B), resulting in that the claw 29 is fitted into the flange 5.

That is, the claw 29 is fitted into a space constituted between the inward directed surface of the protrusion 8 at the flange 5 and the annular frame 7 and then the engaged state of the portable equipment 1 against the belt clip 21 is completed under this state.

Then, under the engaged state, the flange 5 can be moved only toward the upper part of the recess 213 and an engaged relation is created between the extremity end surface of the claw 29 and the annular frame 7 of the flange 5, so that even if a vibration occurs at the belt clip 21, the portable equipment 1 is not removed and a complete engaged and locked state is attained.

Figure 5:
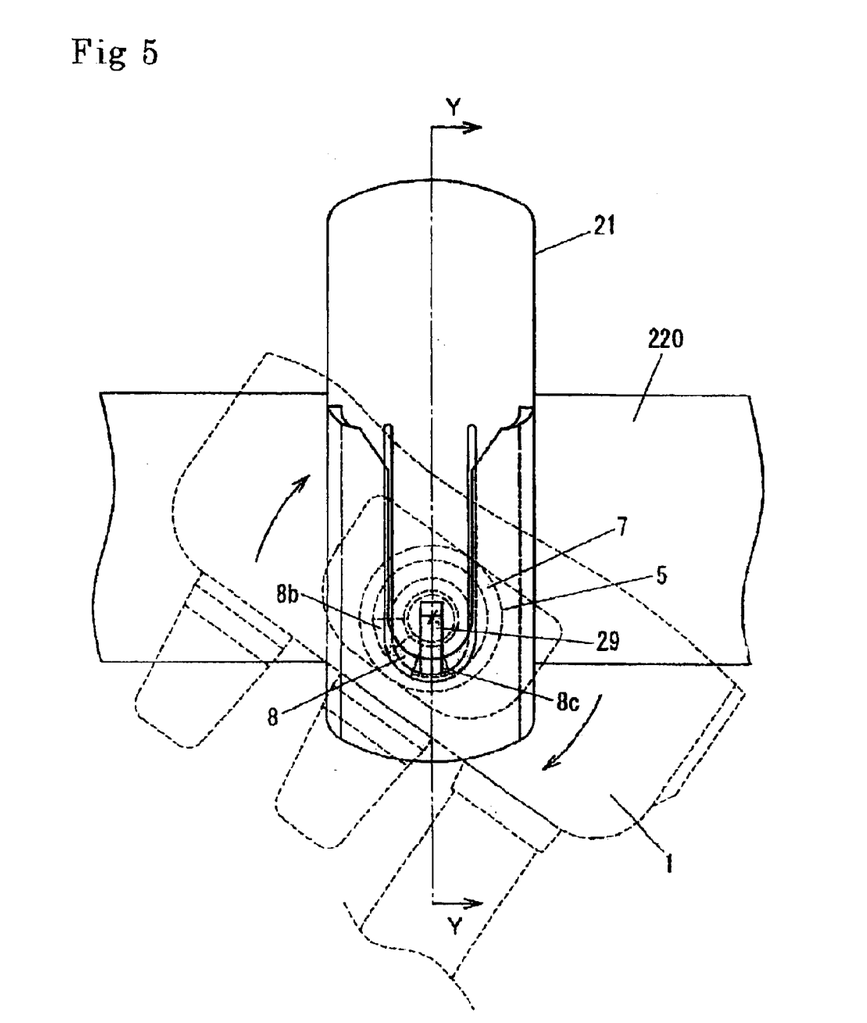
FIG. 5 is a front elevational view for showing a state in which the portable equipment is turned when the portable equipment is removed from the belt clip, where a configuration of the belt clip is indicated by a solid line and a configuration of the portable equipment is indicated by a broken line.
Figure 6:
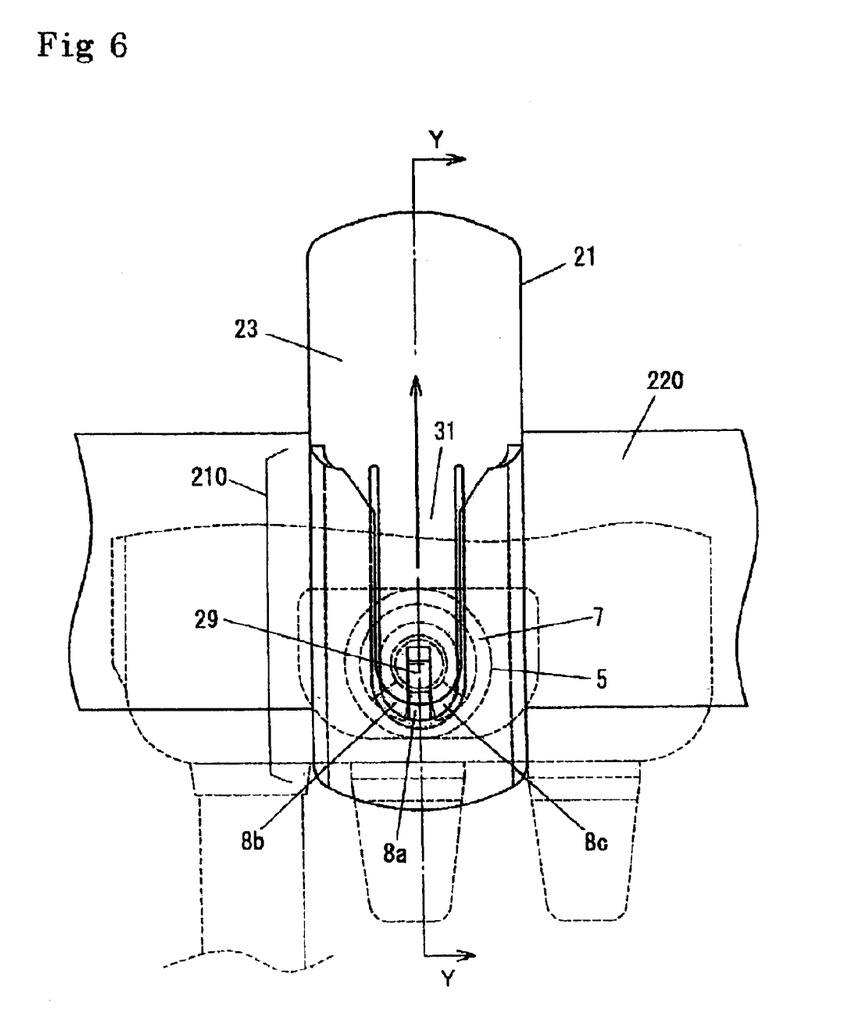
FIG. 6 is a front elevational view for showing a state in which the portable equipment is turned by 180° when the portable equipment is removed from the belt clip and the locked state is released, wherein a configuration of the belt clip is indicated by a solid line and a configuration of the portable equipment is indicated by a broken line.

Then, in order to remove the portable equipment 1 kept under the engaged and locked state from the belt clip 21, the portable equipment 1 is turned as shown in FIG. 5 and it is pulled out upwardly under a state in which it is turned by 180° as shown in FIG. 6.

Figure 7:
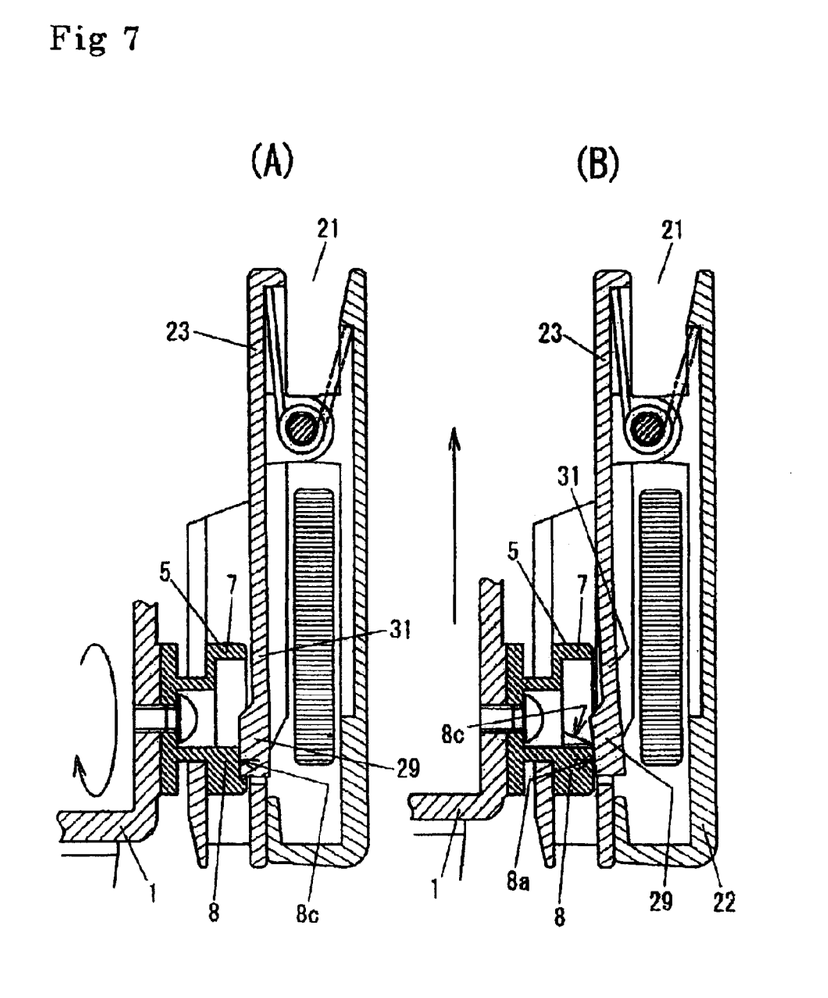
FIG. 7 is a sectional view (A) for showing a state in which a portable equipment is turned when the portable equipment is removed from a belt clip; and a sectional view (B) for showing a state in which the portable equipment is turned by 180°, where these sectional views correspond to sectional views taken along an arrow line Y—Y in FIGS. 5 and 6, respectively.

In addition, the sectional view under each of the states [the sectional views taken along an arrow line Y—Y in FIGS. 5 and 6] is indicated by (A) and (B) in FIG. 7, respectively.

At first, FIGS. 5 and 7(A) illustrate the state in which the portable equipment 1 is turned by about 145°. The flange 5 is turned while the claw 29 at the belt clip 21 is stored in the annular frame 7, and when the flange is turned by about 130° or more, the protrusion 8 at the flange 5 becomes a positional relation in which it is contacted with the side surface of the claw 29.

In this case, since both side portions of the protrusion 8 in its circumferential direction are formed as slant surfaces 8b and 8c, the claw 29 causes the cantilever beam 31 to be flexed while being slidingly contacted with the slant surface 8c from a circumferential direction as the flange 5 is rotated, and at the time when it is turned by 180°, the protrusion 8 causes the claw 29 to be pushed toward the clip 22 rather than toward the surface of the engaging plate 23 as shown in FIGS. 6 and 7(B), resulting in that the upper surface 8a of the protrusion 8 rides over the upper surface of the claw 29.

That is, the protrusion 8 may act as a rotary cam against the claw 29, and the claw 29 of the cantilever beam 31 is retracted as the flange 5 is turned.

Then, as described above, the upper surface 8a of the protrusion 8 is formed in continuous contact with the end surface 7a of the annular frame 7 at the same height.

Accordingly, under the state shown in FIGS. 6 and 7(B), the engaged relation between the claw 29 and the annular frame 7 at the flange 5 has already been released and when the portable, equipment 1 is pulled up in an upward direction from this state, the flange 5 can be smoothly removed from the engaging part 210 at the belt clip 21 and the portable equipment 1 can be released from the engaged and locked state of the belt clip 21.

With the foregoing, in accordance with the engaging mechanism of the preferred embodiment, it is merely satisfactory to perform fitting of the flange 5 into the engaging part 210 at the belt clip 21 under a state in which the portable equipment 1 is set upright in order to cause the portable equipment 1 to be engaged with the belt clip 21 and locked with it, resulting in that the portable equipment 1 is turned by 180° and pulled only when it is required to be removed.

With such an arrangement as above, an operation for engaging and locking the engaging mechanism becomes quite simple as compared with the fact that the portable equipment 101 must be turned by 180° when each of the fitting or removing operation is carried out as found in the prior art engaging mechanism shown in FIGS. 10 to 13.

Preferred Embodiment 2

Figure 8:
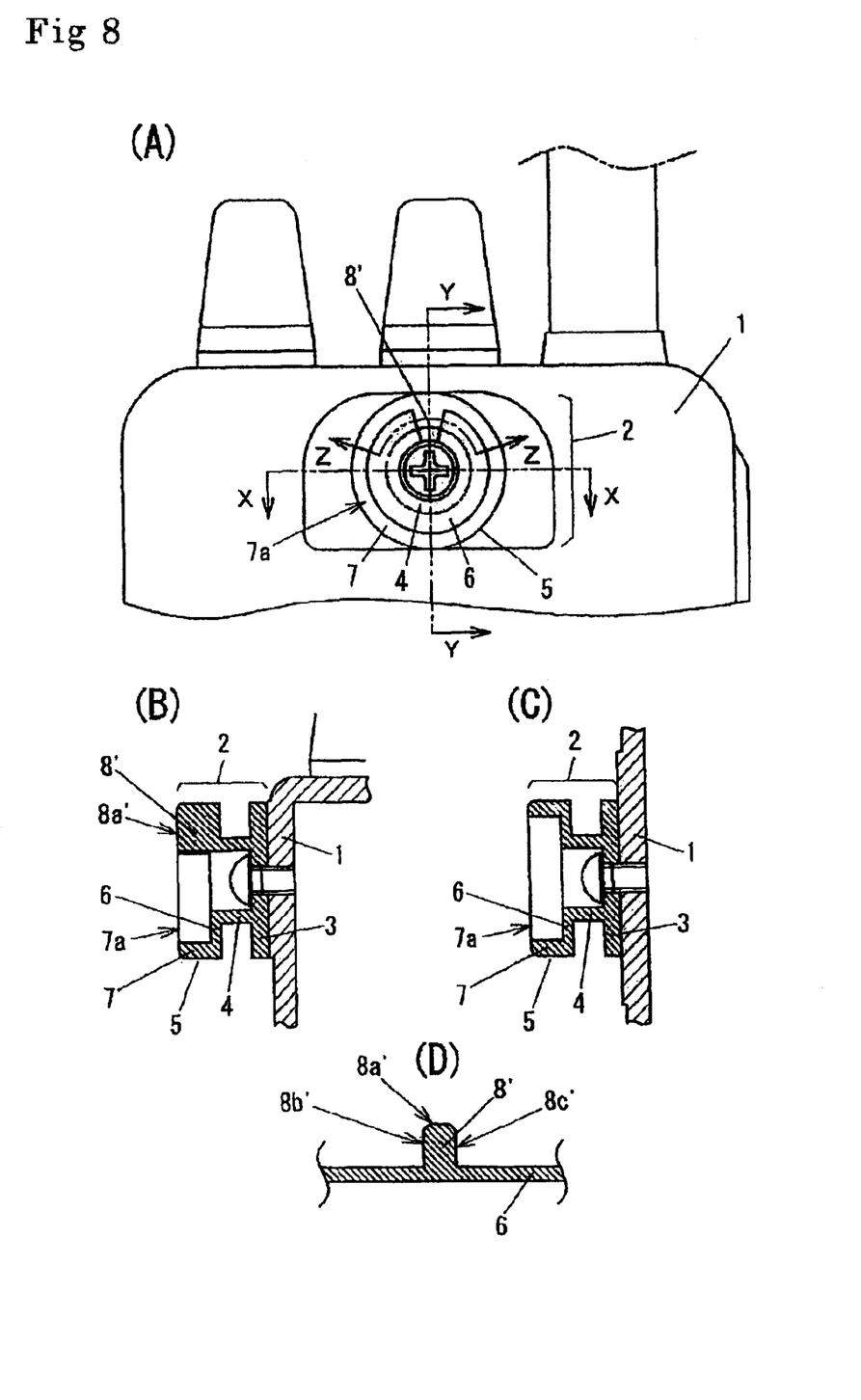
FIG. 8 is a view for showing a mechanism on a portable equipment in accordance with a second preferred embodiment of the present invention, wherein (A) is a substantial front elevational view for showing a portable equipment; (B) is a sectional view taken along an arrow line Y—Y in (A); (C) is a sectional view taken along an arrow line X—X in (A); and (D) is a sectional end view taken along an arrow line Z—Z in (A).

The mechanism on the portable equipment in accordance with the preferred embodiment is shown in FIG. 8, wherein (A) is a substantial front elevational view for showing a portable equipment; (B) is a sectional view taken along an arrow line Y—Y in (A); (C) is a sectional view taken along an arrow line X—X in (A); and (D) is a sectional end view taken along an arrow line Z—Z in (A).

Figure 9:
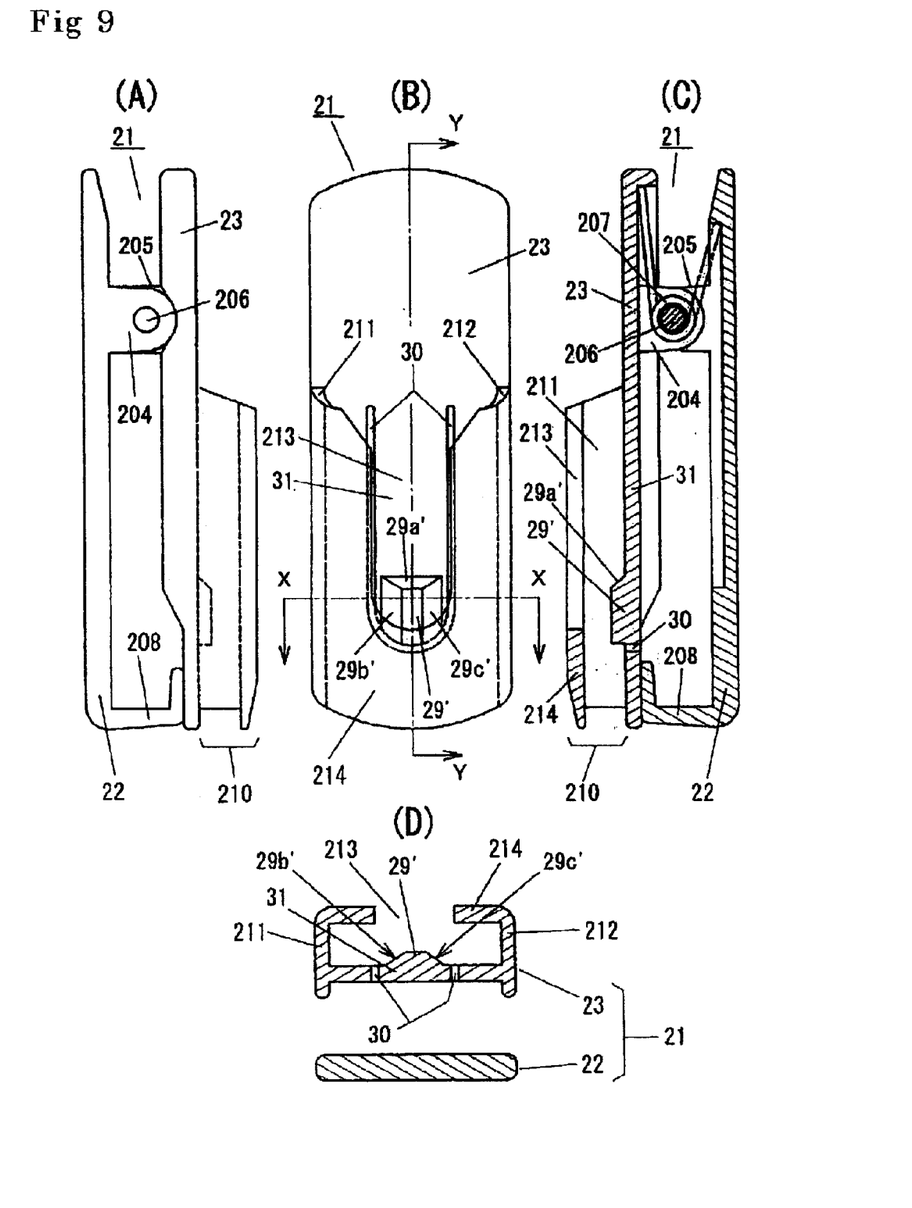
FIG. 9 is a view for showing a mechanism at a belt clip in accordance with a second preferred embodiment of the present invention, wherein (A) is a left side elevational view for showing the belt clip; (B) is a front elevational view; (C) is a sectional view taken along an arrow line Y—Y in (B); and (D) is a sectional end view taken along an arrow line X—X in (B).

In addition, the mechanism on the belt clip is shown in FIG. 9, wherein (A) is a left side elevational view for showing the belt clip; (B) is a front elevational view; (C) is a sectional view taken along an arrow line Y—Y in (B); and (D) is a sectional end view taken along an arrow line X—X in (B).

Then, each of the figures corresponds to each of FIG. 1 and FIG. 2 in the preferred embodiment 1, wherein as apparent from the comparison, almost of all the mechanism elements are the same as those of the preferred embodiment 1.

Accordingly, in FIGS. 8 and 9, only the mechanism elements different from the portable equipment 1 in FIG. 1 and the belt clip 21 in FIG. 2 are denoted by affixing "'" to the reference symbols.

A feature in this preferred embodiment consists in the fact that the circumferential side surface of the protrusion 8' formed at the flange 5 at the portable equipment 1 in FIG. 8 is not applied as slant surfaces 8b and 8c as found in FIG. 1, but constituted as vertical surfaces 8b' and 8c' against the surface of the disc 6, and the fact that the side wall of the claw 29' formed at the cantilever beam 31 at the belt clip 21 in FIG. 9 is not perpendicular to the surface of the engaging plate 203 as found in FIG. 2, but constituted as the slant surfaces 29b' and 29c'.

That is, although it is required that surfaces contacted to each other in respect to the circumferential direction become sliding pairs constituting the cam mechanism, their slant surfaces are reversed at the flange and at the claw.

Also in the case of this preferred embodiment, when the portable equipment 1 is engaged with and locked to the belt clip 21, it is satisfactory to perform only fitting of the flange 5 to the engaging part 210 at the belt clip 21 under a state in which the portable equipment 1 is set upright in the same manner as that of the preferred embodiment 1, the cantilever beam 31 is flexed to cause the claw 29' to be retracted while the lower side of the annular frame 7 at the flange 5 being slidingly contacted with the upper side slant surface 29a' formed at the claw 29' at the belt clip 21, the entire claw 29' is fitted inside the annular frame 7 under a state in which the short column 4 is engaged with the lower-most part of the recess 213 in the same state shown in FIGS. 3 and 4(B) in the preferred embodiment 1, and at this stage, it becomes an engaged and locked state.

In turn, also when the portable equipment 1 is removed from the belt clip 21, the portable equipment 1 is also turned by 180° from the aforesaid state in the same manner as that of the preferred embodiment 1.

During the turning process, although the protrusion 8' at the flange 5 of the portable equipment 1 is contacted with the claw 29' at the belt clip 21 from its side, even if the side surfaces in the circumferential direction of the protrusion 8' are vertical surfaces 8b' and 8c' as described above, the side walls of the claw 29' are slant surfaces 29b' and 29c', so that the protrusion 8' causes the cantilever beam 31 to be flexed and the claw 29' to be pushed into it while being slidingly contacted with the slant surfaces 29b' and 29c' of the claw 29', and retracted toward the clip 22 as the flange 5 is turned.

As a result, at the time when the portable equipment 1 is turned by 180°, the upper surface 8a' of the protrusion 8' at the flange 5 rides over the upper surface of the retracted claw 29' and the lock mechanism is released under this state, so that pulling-up the portable equipment 1 as it is enables the flange 5 to be removed from the engaging part 210 at the belt clip 21.

In other words, the shape of the protrusion 8' and the shape of the claw 29' are merely different from those of the former preferred embodiment and this preferred embodiment may also constitute the fitting or removing mechanism against the belt clip 21 of the portable equipment 1 under the same principle of function as that of the aforesaid preferred embodiment 1, and its fitting or removing operation is the same as that of the preferred embodiment 1.

The engaging mechanism of the portable equipment against the belt clip in accordance with the present invention has the aforesaid configuration and provides the following effects.

The engaging mechanism for use in engaging and locking an easy protrusion arranged at the portable equipment engaged with and locked against the engaging part at the belt clip is operated such that mere linear engaging operation causes the portable equipment to be locked with the belt clip without turning the portable equipment by 180° as found in the prior art and a mechanism having a sufficient state can be realized only by turning the portable equipment by 180° to be locked only when the portable equipment is removed from the belt clip and its fitting or removing operation is facilitated.

Accordingly, although the prior art frequently shows a case in which the lock is not engaged when it is forgotten to turn the portable equipment by 180°, the portable equipment drops by vibration or the like at the belt clip to cause some trouble or damage, such an unexpected state as above can be prevented in the present invention.

In addition, the present invention does not add a separate mechanism element as compared with the constitution of either the portable equipment or the belt clip and its rational function is realized by an easy configuration of mere partial improvement, resulting in that its manufacturing cost is scarcely changed.

Although the subject invention has been described in terms of the embodiments disclosed herein it is to be understood by those skilled in the art that the subject invention is not to be limited to the disclosed embodiments but is to be accorded the full breadth and scope of the appended claims.

What is claimed is:

1. A mechanism for engaging an item of portable equipment to a belt clip in which the portable equipment is provided with a protrusion comprised of a short column and a flange, and the belt clip includes a plate surface formed with an engaging part composed of frames arranged at both sides and a front plate formed with a substantial U-shaped recess having a released side and a fitting limit part, wherein the short column may be guided by the recess at said belt clip to cause the flange to be fitted to and held at the engaging part, thereby said portable equipment is removably attached to said belt clip, wherein the improvement comprises:

said flange of said portable equipment having a disc and a continuous annular frame formed at the circumferential edge of the disc forming a locking recess with an outwardly facing end surface; and a cam surface projecting radially inwardly from said outwardly facing end surface of said annular frame and having its circumferential side applied as a slant surface, and in turn, said plate surface having a substantially U-shaped slit defining a resilient cantilever beam formed with a claw having a slanted side surface corresponding to said released side of the recess and the opposite side surface of said claw applied as an engaging surface against said annular frame in an area opposing an inwardly directed surface of said cam surface and said annular frame under a state in which the flange at the portable equipment reaches said fitting limit part of said engaging part and said claw is in said locking recess.

2. A mechanism for engaging a portable equipment to a belt clip including a clip portion for attaching to a belt, said mechanism comprising:

a protrusion having a base for mounting to said portable equipment and an outwardly projecting reduced diameter column terminating in a flange formed by an enlarged disc with an outwardly projecting annular frame defining a claw receiving recess, said annular frame including a cam projecting inwardly from annular frame and having at least one circumferentially positioned slanted surface; and an engaging plate coupled to said clip portion, said engaging plate including an engaging part spaced apart from an engaging plate by a pair of opposing side frames and supporting an outwardly facing front plate formed with a substantially U-shaped column guide slot having an open end and a limiting end and being dimensioned to slidingly receive said column of said protrusion, said engaging plate formed with a substantially U-shaped slit defining a resilient cantilever beam with a claw projecting toward said engaging part and having a slanted surface corresponding to said open end of said U-shaped column guide slot, said protrusion being operable to slide down said guide slot with said column in said slot to engage said annular frame with said slanted surface to drive said claw toward said belt clip and to receive said claw in a seated position within said claw receiving recess as said column abuts said limit part, said protrusion further being operable to drive said claw from said claw receiving recess upon rotation of said protrusion to engage said circumferentially positioned slanted surface of said cam with said claw whereby said protrusion may be slid toward said open end of said recess and removed from said belt clip.

3. A mechanism as set forth in claim 2 wherein:

said outermost surface of the said cam surface is flush with an outermost surface of the annular frame.

4. A mechanism as set forth in claim 2 wherein:

said cam surface is in the form of a trapezoid when viewed in radial cross section.

5. A mechanism as set forth in claim 2 wherein:

said cam surface includes two circumferentially opposed slant surfaces.

6. A mechanism as set forth in claim 2 wherein:

said engaging plate is pivotally connected to said clip portion.

7. A mechanism as set forth in claim 2 wherein:

a surface of said claw opposing said slanted surface is parallel to an interior of said annular frame when said claw is seated in said claw receiving recess.

8. A mechanism as set forth in claim 2 wherein:

said annular frame is continuous.

9. A method for removably attaching an item of portable equipment to a strap of material comprising:

providing a protrusion including a mounting base and an outwardly projecting short column terminating in a flange with an annular frame defining a claw receiving recess and a cam projecting radially inwardly from said annular frame and having at least one circumferentially disposed slanted surface;

mounting said base to said portable equipment;

providing a belt clip with a clip portion for insertion over said strap and an engaging plate coupled to said clip portion, said engaging plate including an engaging part spaced apart from an engaging plate by a pair of opposing side frames and supporting an outwardly facing front plate formed with a substantially U-shaped column guide slot having an open end and a limiting end and being dimensioned to slidingly receive said column of said protrusion, said engaging plate formed with a substantially U-shaped slit defining a resilient cantilever beam with a claw projecting toward said engaging part and having a slanted surface corresponding to said open end of said U-shaped column guide slot, hooking said belt clip to said strap; and sliding said protrusion down said guide slot with said column in said slot to engage said annular frame with said slanted surface and drive said claw toward said belt clip until said column abuts said limit part and said claw is in a seated position in said claw receiving recess.

10. A method as set forth in claim 9 further comprising:

rotating said protrusion to engage said circumferentially disposed slanted surface with said claw to drive said claw from said claw receiving recess;

withdrawing said protrusion toward said open end of said recess and removing from said belt clip with one hand.

\* \* \* \* \*